Nov. 30, 1943.    G. WINTRISS ET AL    2,335,626
MANUFACTURE OF SLIDE FASTENERS
Filed May 20, 1941    5 Sheets-Sheet 1
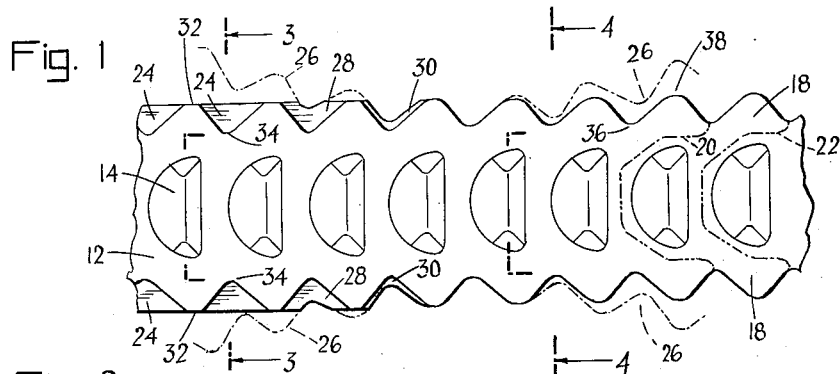
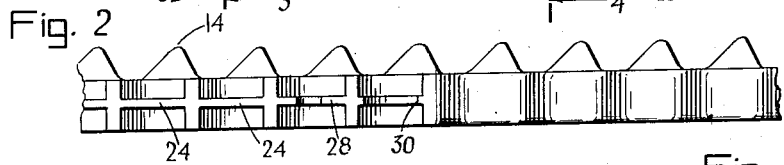
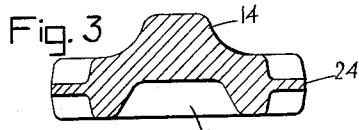
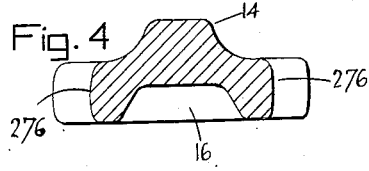
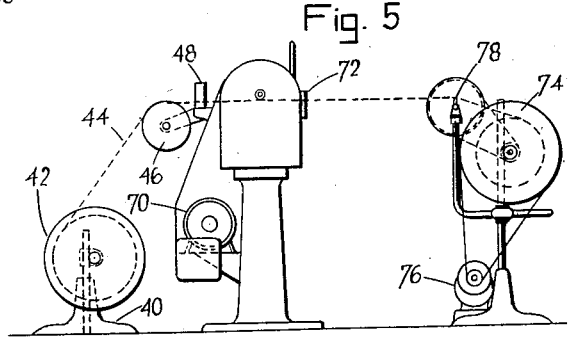
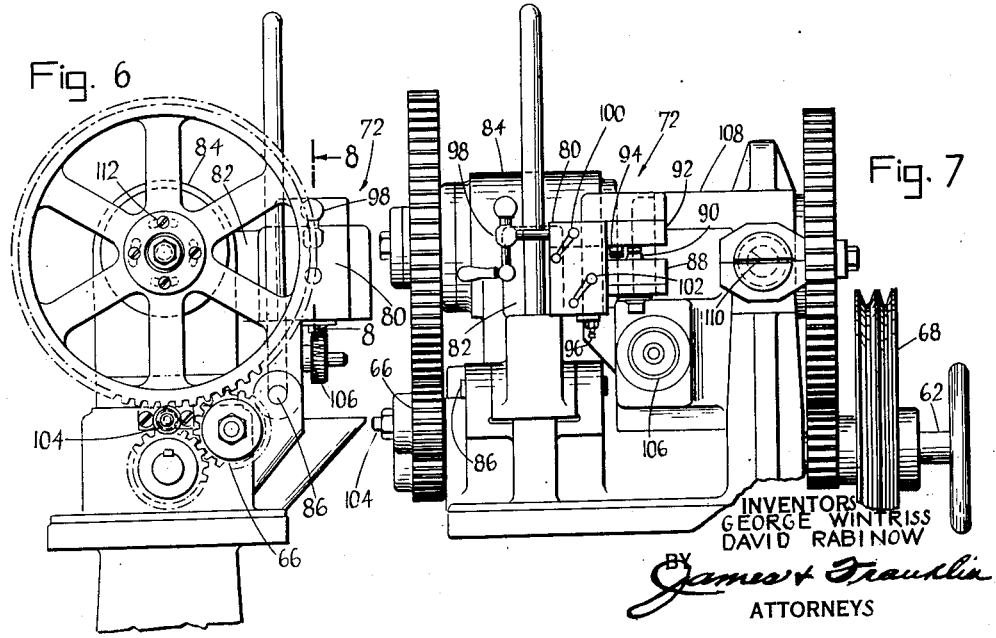
INVENTORS
GEORGE WINTRISS
DAVID RABINOW
BY James & Franklin
ATTORNEYS

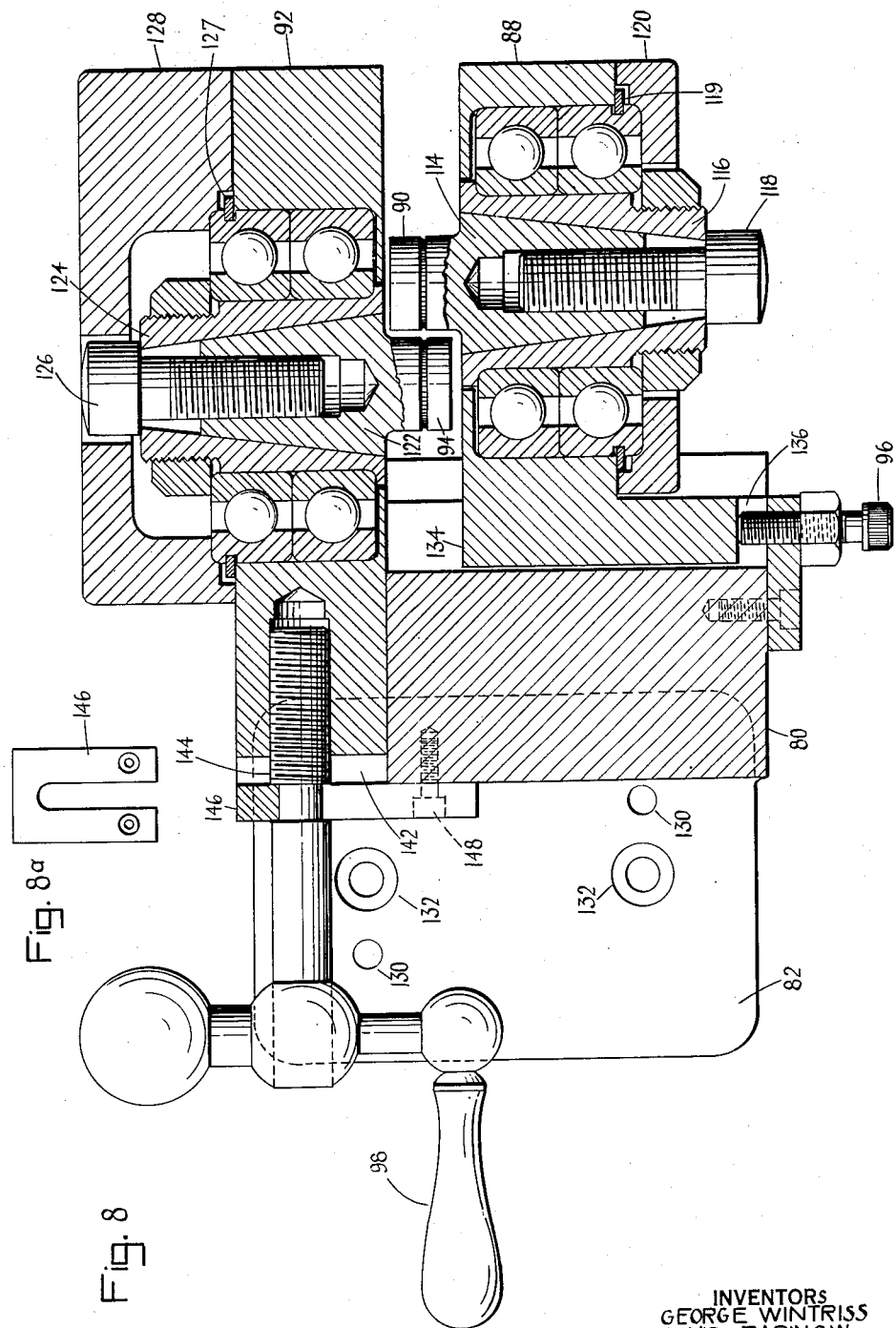

Nov. 30, 1943.   G. WINTRISS ET AL   2,335,626
MANUFACTURE OF SLIDE FASTENERS
Filed May 20, 1941   5 Sheets-Sheet 3
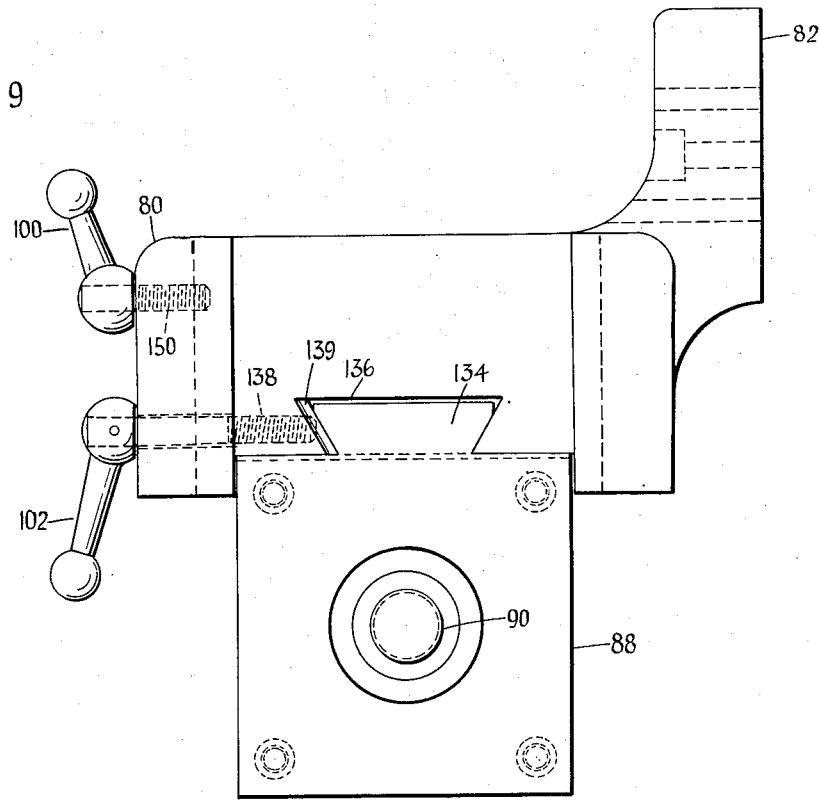
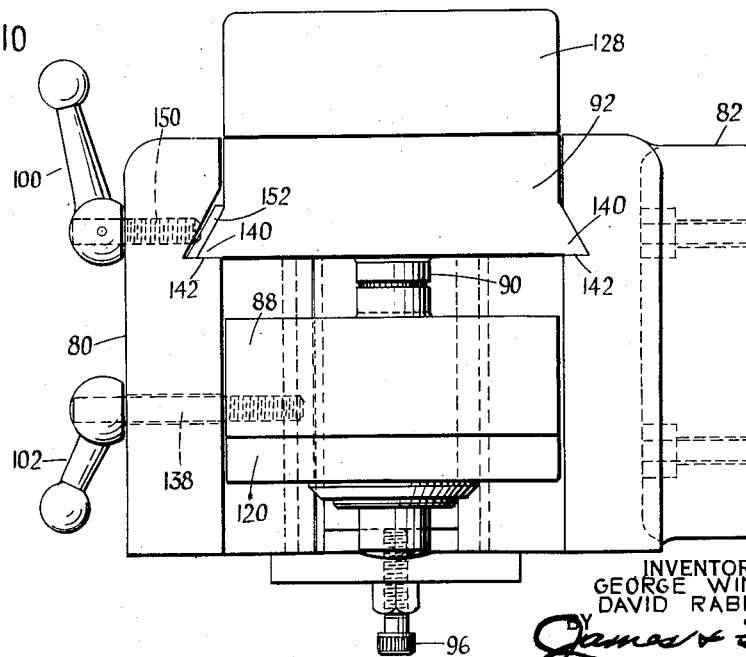
INVENTORS
GEORGE WINTRISS
DAVID RABINOW
ATTORNEYS

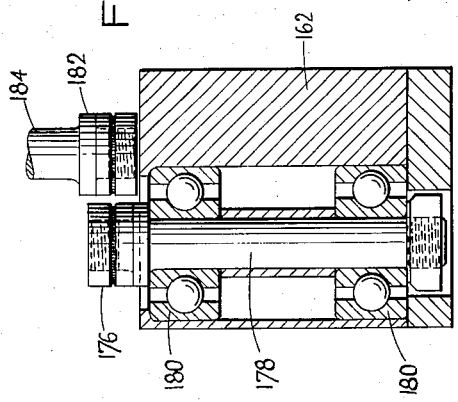
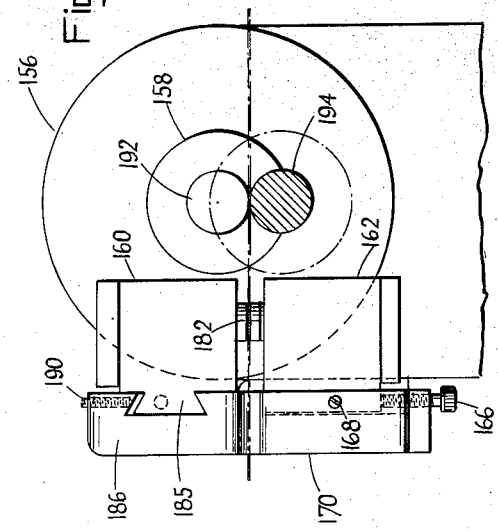
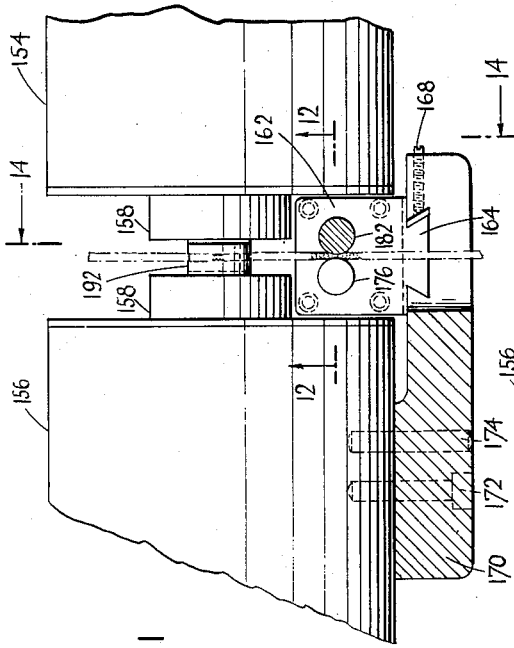
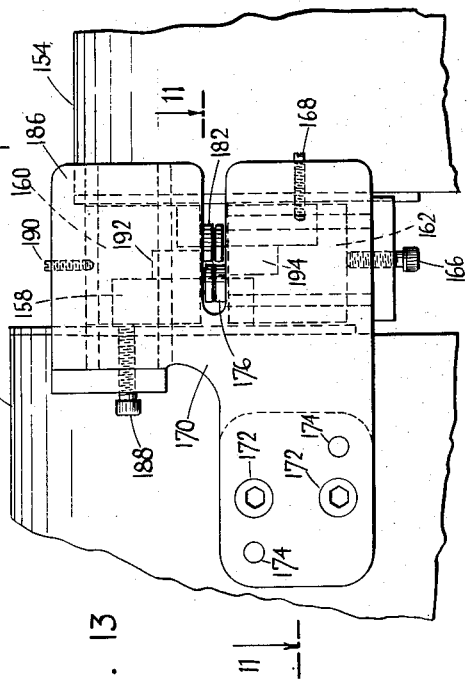

Nov. 30, 1943.    G. WINTRISS ET AL    2,335,626
MANUFACTURE OF SLIDE FASTENERS
Filed May 20, 1941    5 Sheets-Sheet 5
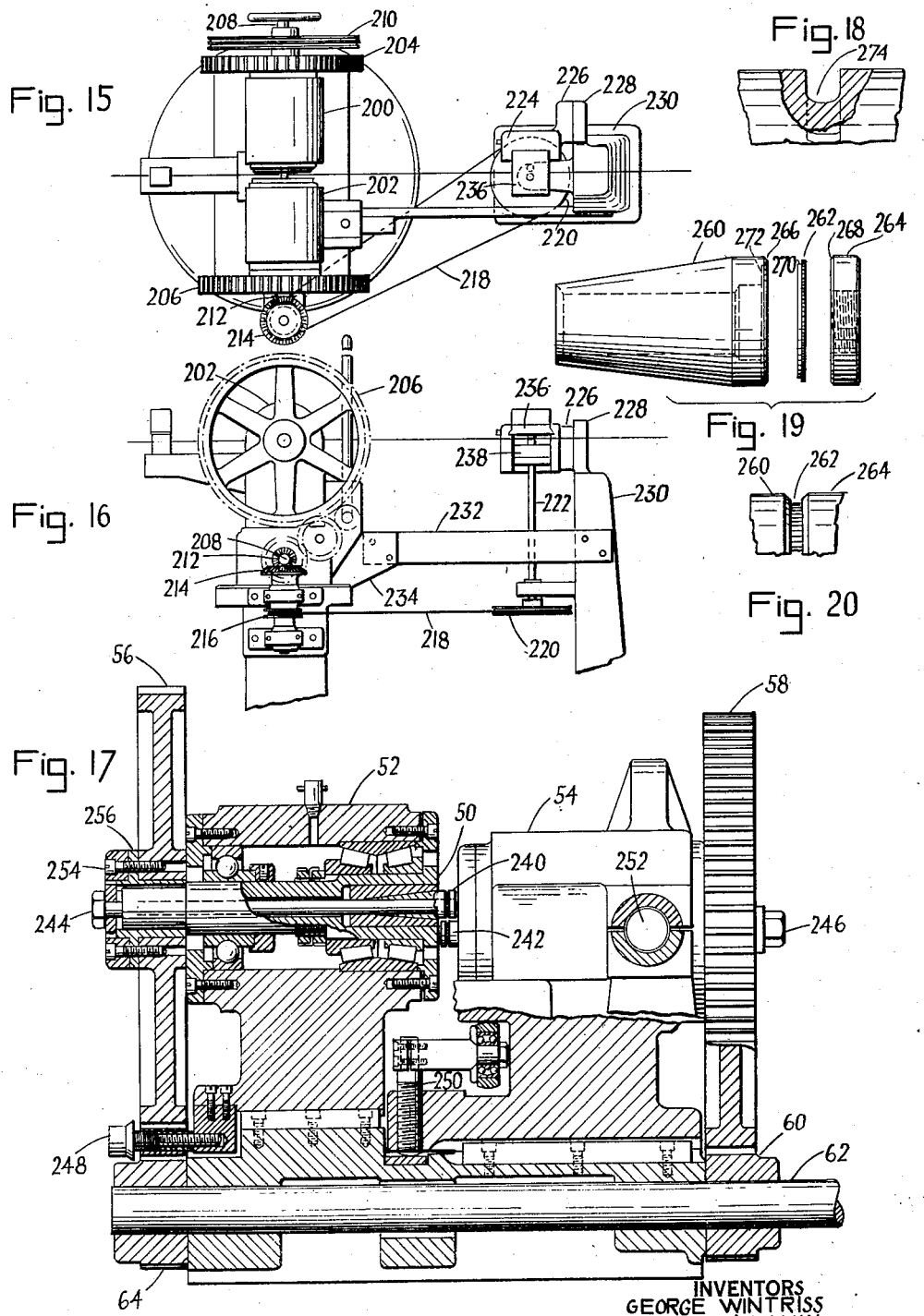
INVENTORS
GEORGE WINTRISS
DAVID RABINOW
BY
ATTORNEYS Patented Nov. 30, 1943

2,335,626

UNITED STATES PATENT OFFICE 2,335,626

MANUFACTURE OF SLIDE FASTENERS

George Wintriss, Alexandria, Va., and David Rabinow, Brooklyn, N. Y., assignors to Conmar Products Corporation, Bayonne, N. J., a corporation of New Jersey Application May 20, 1941, Serial No. 394,266

15 Claims. (Cl. 80—27)

This invention relates to slide fasteners, and more particularly to an improved method and apparatus for manufacturing the same.

The primary object of the invention is to generally improve the manufacture of slide fasteners. A more particular object is to simplify and cheapen the manufacture of the same.

One commercially used method of making slide fasteners consists in successively cutting the fastener elements from a strip comprising a series of consecutive embryo fastener elements with spread jaws, the head of one embryo element being nested within and filling the space between the spread jaws of the next element. In order to provide elements which when closed will have substantially parallel side walls and substantially perpendicular end walls, the strip of embryo elements is provided with serrations along its edges, these serrations corresponding to the outer ends of the spread jaws. The strip is preferably formed by a rolling process, and in that case, comes out with a series of small, thin, substantially triangular fins in the notches of the side edges of the strip. These fins are being removed by cutting the same with a punch in the machine which severs the fastener elements and attaches the same to a tape. This complicates the machine, largely because the scrap or fins thus removed are so tiny that they are difficult to handle and to remove from the cutting station.

The primary object of the present invention is to overcome the foregoing difficulty, and to provide a method and apparatus to eliminate the fins, that is, to provide a serrated strip which is devoid of fins. This is done, generally speaking, by providing a pair of rolls having serrated peripheries formed negatively to the desired serrated edges, said rolls being used to displace the relatively thin fins inwardly, and preferably to additionally form the side edges of the strip to desired contour.

To the accomplishment of the foregoing and other more particular objects which will hereinafter appear, our invention consists in the method steps and apparatus elements and their relation one to the other, as hereinafter are more particularly described in the specification and sought to be defined in the claims. The specification is accompanied by drawings, in which:

Fig. 1 is a plan view of a piece of strip partially transformed from a wire with fins, to a wire devoid of fins;

Fig. 2 is an elevation of the same;

Fig. 3 is a transverse section taken approximately in the plane of the line 3—3 of Fig. 1;

Fig. 4 is a transverse section taken approximately in the plane of the line 4—4 of Fig. 1;

Fig. 5 is a side elevation of a rolling mill provided with means for displacing the fins;

Fig. 6 is a side elevation of the head or main part of the apparatus drawn to larger scale;

Fig. 7 is a front elevation of the same;

Fig. 8 is a longitudinal section through the fin displacing roll portion of the apparatus shown in Figs. 5, 6, and 7, said section being taken approximately in the plane of the line 8—8 of Fig. 6;

Fig. 8a shows a detail;

Fig. 9 is a plan view of the fixture with the upper roll and its slide removed;

Fig. 10 is an end elevation of the fixture;

Fig. 11 is a partially sectioned plan view of a part of the rolling mill with a modified fin displacing roll fixture, said section being taken approximately in the plane of the line 11—11 of Fig. 13;

Fig. 12 is a partial section taken in elevation approximately in the plane of the line 12—12 of Fig. 11;

Fig. 13 is a front elevation of the modified rolling mill;

Fig. 14 is a transverse section taken approximately in the plane of the line 14—14 of Fig. 11;

Fig. 15 is a plan view of a modified apparatus having a frictionally driven fin displacing roll;

Fig. 16 is a side elevation of the same;

Fig. 17 is a partially sectioned elevation through a rolling mill provided with power-driven fin displacing rolls;

Fig. 18 is a partially sectioned fragmentary view of the fin displacing roll used in the apparatus of Figs. 5 through 10;

Fig. 19 shows the parts of an assembled fin displacing roll used in the machine of Fig. 17; and Fig. 20 is a fragmentary view explanatory of a detail.

Referring to the drawings, and more particularly to Figs. 1 through 4, the metal strip 12 comprises a series of embryo slide fastener elements, each element having a head with interlockable means, said interlockable means in the present case consisting of a projection 14 on the upper side of the head, and a recess 16 (Fig. 3) on the lower side of the head. Each element also comprises spread jaws, most clearly indicated at 18 (Fig. 1) because of the broken lines 20 and 22 which have been included to show how the strip may be severed into individual fastener elements. In order to provide elements which when closed have substantially parallel sides and substantially perpendicular ends, the side edges of the strip are preferably serrated. This strip is most conveniently formed in a rolling mill of the character disclosed by George Wintritz in United States Letters Patent No. 2,201,068, issued May 14, 1940, but in such case the strip obtained may be imperfect by reason of thin, residuary triangular fins 24 disposed in the notches at the side edges of the strip.

The removal of these fins by the use of a reciprocating punch forming a part of the machine for severing and attaching the elements to a tape, has proved troublesome, particularly so because of their minute size. Attempts to remove the fin by rotary cutting means or trimming rolls, have proved troublesome because of the difficulty of maintaining proper synchronism; the problem of clearing the mechanism of the tiny bits of fin; and the fact that the edges of the strip may not be left in the desired smooth and preferably convexly rounded condition.

In accordance with features and objects of the present invention, the fin is not cut away, but is displaced inwardly. The metal of the fin is preferably redistributed and so disposed on the sides of the strip as to obtain not only the desired serrations (when looking in plan), but also a smooth convex edge (when viewed in transverse section).

For this purpose, the strip 12 with the fins 24 is preferably subjected to the action of a pair of fin displacing rolls the peripheries of which are schematically indicated by the broken lines 26 (Fig. 1), these rolls turning on axes perpendicular to the plane of the wire, and having a serrated or toothed periphery conforming to the desired serrated edges. The manner in which these rolls operate will be clear from inspection of Fig. 1, in which the fins 28 are slightly indented by the teeth approaching the wire; the fins 30 are displaced well inwardly and are nearly eliminated by the next teeth of the rolls; and the fins are completely displaced or eliminated by the following teeth.

It may be pointed out that the wire is initially provided with small flat surfaces 32 (Fig. 1) instead of being pointed, but the notches are preferably (though not necessarily) pointed or nearly pointed, as indicated at 34, so that the displacing rolls, as the inwardly displaced metal tends to crowd metal into the root of the notch, provide a somewhat rounded curve, as indicated at 36. The rolls also tend to point or round the flat surfaces 32, as is indicated at 38.

Before leaving Fig. 1, it may be pointed out that the problem of synchronism is most readily solved by permitting the fin displacing rolls 26 to run as idle or undriven rolls. It will be appreciated that because the fins are very thin relative to the main body of the wire, the fins offer only slight resistance to displacement, compared to the main body of metal. Consequently, if the fin displacing rolls are idle (or conversely, if the wire is freely longitudinally movable or self-adjustable relative to the rolls while the rolls are driven), the teeth on the rolls will seat themselves automatically and self-adjustably into the notches in the sides of the wire.

The complete apparatus for forming the finished wire is shown in Fig. 5, this comprising a support 40 for a supply reel 42 of smooth, uniform wire 44, said wire preferably being round in cross-section, as that is the most economical to purchase. The wire passes over a guide wheel 46, and through a lubricating station 48. It then passes through appropriate horizontal and vertical straightening rolls, not shown, and then between main coining rolls also not visible in Fig. 5.

The machine probably requires no detailed description, it being substantially the same as that disclosed in Wintritz Patent No. 2,201,068 aforesaid, and also being substantially the same as that illustrated in Fig. 17, except for the nature of the rolls employed in the machine. In Fig. 17 it will be seen that the rolls are small-diameter, over-hung rolls carried in sturdy large-diameter shafts such as the shaft 50, said shafts extending in opposite directions and having large sturdy bearings carried in massive bearing housings 52 and 54. The outer ends of the shafts carry gears 56 and 58, the gear 58 being driven by a pinion 60 on a drive shaft 62, and the gear 56 being driven at the same speed but in opposite direction by means of a pinion 64 coupled to gear 56 through an idle pinion not shown in Fig. 17, but clearly visible at 66 in Figs. 6 and 7. Referring to Fig. 7, the driving shaft 62 carries appropriate pulleys 68 which are belted to a driving motor, shown at 70 in Fig. 5.

From the main coining rolls the wire passes through a fixture 72 (Fig. 5) carrying the fin displacing rolls, this fixture being mounted directly on the head of the main rolling mill. The wire with the displaced fins is then wound on a take-up reel 74, said reel preferably being motor-driven, as by means of a motor 76, in order to aid in pulling the wire through the fin displacing rolls, particularly so if the latter are idle rolls. A self-reversing screw-threaded feed device 78 may be provided for guiding the wire back and forth as it is wound on the reel 74. The drive between motor 76 and reel 74 is preferably a frictional drive, as by means of the belt, and is selected to attempt to drive the reel too fast. This takes care of changes in diameter as the reel is wound with wire, and keeps the wire under tension as it is pulled through the fin displacing rolls.

Referring now to Figs. 6 and 7, the head of the machine is there shown to somewhat larger scale. The attachment 72 comprises a stationary part 80 having a base 82 which is preferably secured to only one of the main bearing housings in order not to interfere with tilting of bearing housing 84 about the pivot 86. In the present case the attachment 72 is mounted on housing 84 and moves with it. The fin displacing rolls are preferably axially and radially adjustable relative to one another, the latter adjustment being particularly important. For axial adjustment the stationary part 80 slidably carries a vertically adjustable bearing 88 which, in turn, carries one of the fin displacing rolls 90.

The stationary part 80 also slidably carries a horizontally adjustable bearing 92 which, in turn, carries the other fin displacing roll 94, thus affording radial adjustment, that is, adjustment of the center to center spacing of the rolls. It will be observed that the rolls rotate on vertical axes and are therefore perpendicular to the main coining rolls which rotate on horizontal axes. The vertical adjustment of bearing 88 may be controlled by a screw 96, and the horizontal adjustment of bearing 92 may be controlled by means of a screw and handle 98. The adjustments may be locked by means of handles 100 and 102 controlling set screws.

The main coining rolls are preferably arranged to have the three adjustments set forth in the Wintritz Patent 2,201,068. Axial adjustment is provided by means of a micrometer screw 104. Radial adjustment is provided by means of a handle 106 controlling a micrometer screw for tilting the lower bearing housing 108 about horizontal trunnions 110. Because the coining rolls are power-driven rolls, a rotative adjustment is also provided, this being indicated by the bolts and slots 112 (Fig. 6).

Thus the main coining rolls and the secondary fin displacing rolls are similar in preferably having radial and axial adjustments, but the fin displacing rolls have no provision for rotative adjustment because these rolls preferably run idly in order to self-adjustably synchronise themselves with the wire being treated.

The attachment carrying the fin displacing rolls is better shown in Figs. 8, 8a, 9, and 10 of the drawings, and referring to these figures, it will be seen that the lower roll 90 is formed integrally with a tapered shank 114 which is pulled into a short hollow shaft 116 by means of a bolt 118. Shaft 116 is carried by ball bearings, the outer races of which are received in bearing housing 88 and are held therein by means of a snap ring 119 and a bearing cap 120.

Similarly, the upper roll 94 is formed integrally with a tapered shank 122 which is drawn into a short hollow shaft 124 by means of a bolt 126. The shaft 124 is carried by anti-friction bearings which are received in bearing housing 92 and are held therein by means of a snap ring 127 and a bearing cap 128. The bearings in the case of both rolls are arranged to not only take the main radial load, but also to prevent axial movement of the rolls.

The stationary part 80 is cast integrally with the base 82, this being provided with dowel or locating holes 130 and bolt holes 132 for mounting the same on the rolling mill as previously described. The bearing housing 88 has a dovetail 134 slidably received in a mating slot 136 (Fig. 9). The adjustment is by means of screw 96 previously referred to, and the dovetail may be locked in adjusted position by means of a set screw 138 (Figs. 9 and 10) controlled by handle 102 previously referred to. The screw 138 bears directly against a liner 139 (Fig. 9) which, in turn, bears against one side of dovetail 134.

The bearing housing 92 is provided with a dovetail 140 (Fig. 10) received in a mating slot 142. The bearing housing is adjusted by means of a screw 144 (Fig. 8) controlled by the handle 98 previously referred to. The screw is held against axial movement by a U-shaped support 146, best shown in Fig. 8a, said support being secured to the stationary part of the fixture by bolts 148, as is shown in Fig. 8. The position of the bearing housing may be locked by means of a set screw 150 (Figs. 9 and 10) controlled by handle 100, said screw 150 bearing against a liner 152 (Fig. 10).

The horizontal adjustment of bearing 92 is particularly facilitated by the provision of the relatively large and easily accessible handle 98 because the effectiveness of the fin displacing operation depends on the relation of the center to center spacing between the rolls, to the width of the wire. Upon any variation of the width of the wire as, for example, due to change from one reel of wire to another, or from one alloy to another, etc., and sometimes even in the course of rolling of a single reel of wire because of slight changes in wire diameter or wire hardness, etc., the spacing of the fin displacing rolls may mave to be correspondingly varied.

It will be recollected that in connection with Fig. 5, it was pointed out that the rolled wire is wound up under drive of a motor 76. This motor tends to run somewhat too fast, but a frictional connection is provided by the belt or by the use of other suitable means for the purpose. The pull on the wire caused by the take-up roll 74 is important in order to pull it through the fin displacing rolls, because these rolls are idle yet offer considerable resistance to the passage of the wire. The amount of pull needed at the take-up roll may be minimized by shortening the distance between the coining rolls and the fin displacing rolls, because when that distance is made very small, then the stiffness of the wire may itself approach or even be adequate to push the wire through the fin displacing rolls.

A modified form of the invention designed to locate the fin displacing rolls very close to the coining rolls is shown in Figs. 11 through 14 of the drawings, referring to which it may be explained that the lower main bearing housing is shown at 154, while the upper main bearing housing is shown at 156. These housings are cut away or reduced in diameter at 158, thus forming a space therebetween large enough to receive the bearing housings 160 and 162 (Fig. 14) of the fin displacing rolls. The section shown in Fig. 11 is taken below the upper bearing housing and therefore shows only the lower bearing housing 162. This is provided with a dovetail 164 and is vertically adjustable by means of adjusting screw 166 (Figs. 13 and 14) and a lock screw 168 (Figs. 11 and 13), much as previously described, except that the slot for the dovetail 164 is formed on the inside face of a bracket 170 disposed outside of the bearing housings. This bracket is secured to the bearing housing 156 by bolts 172 and dowels 174, such as previously described. The lower bearing housing 162 carries a lower roll 176 formed at the upper end of a shaft 178 (Fig. 12) received in bearings 180. The upper roll 182 is carried by the upper bearing housing 160 in a similar fashion, it being formed at the lower end of a shaft 184 (Fig. 12). The upper bearing housing is provided with a dovetail 185 (Fig. 14) and is horizontally slidable in a slot formed on the inner face of the upper part 186 (Fig. 13) of the bracket 170. The radial adjustment is provided by means of screw 188 (Fig. 13) and is locked by means of screw 190 (Figs. 13 and 14). The upper and lower main coining rolls are indicated, respectively, at 192 and 194 (Figs. 11 and 14).

It will be understood that the arrangement shown in Figs. 11 through 14 is substantially the same in principle to that previously described, it differing primarily in bringing the fin displacing rolls 176, 182 very close to the coining rolls 192 and 194, so that the forceable movement of the wire by the powerfully driven coining rolls tends to push the wire through the idle (non-driven) fin displacing rolls. How much additional pull may be needed at the take-up reel in order to prevent buckling of the wire between the coining rolls and the fin displacing rolls depends on the character and dimensions of the wire, etc.

It is not essential for the fin displacing rolls to be wholly idle. They may instead be driven, but preferably by means of a frictional or slip drive tending to move the same faster than necessary, so that the problem of synchronism will take care of itself such as before. Moreover, we have found that only one of the rolls need be frictionally driven in this fashion, the other roll running in synchronism therewith through the action of the serrated wire itself.

An arrangement of this character is illustrated in Figs. 15 and 16 of the drawings, referring to which the main rolling mill is substantially the same as that previously described, it comprising coining rolls carried in massive shafts passing through massive main bearings 200 and 202. The shafts have gears 204 and 206 which, in turn, are driven by a countershaft 208 carrying pulleys 210, said pulleys being belted to the main driving motor. In accordance with the present invention the opposite end of the countershaft 208 carries a relatively small or light-duty bevel gear 212 meshing with a bevel gear 214 on a vertical shaft carrying a small pulley 216 (Fig. 16). Said pulley is belted by means of a belt 218 to a pulley 220 carried at the lower end of a vertical shaft 222 projecting downwardly from one of the fin displacing rolls. It preferably extends downwardly from the axially adjustable roll, and the amount of axial adjustment needed is so slight that it may be accommodated at the belt 218, the shaft 222 simply moving upwardly or downwardly the slight amount needed.

The fixture for the fin displacing rolls may be much like that described in connection with Figs. 8, 9, and 10, it comprising a stationary part 224 having a base 226 which, instead of being secured to the rolling mill, is secured to an offset upward projection 228 at the upper end of a pedestal 230 which preferably extends downwardly to the floor and has its own base. Its relation to the rolling mill, however, may be sturdily fixed, as by means of a connecting bar 232 having one end bolted to an extension 234 on the rolling mill frame, and its other end bolted to the pedestal 230.

The stationary part 224 carries a horizontally adjustable bearing 236 carrying the upper fin displacing roll, and a vertically adjustable bearing 238 carrying the lower fin displacing roll, such as was previously described in connection with Figs. 8–10, except for the fact previously mentioned that the shaft of the lower roll is extended downwardly at 222. If a tapered shank is used for the roll then the drawbolt for the same may be formed directly on the upper end of shaft 222, the shaft being shouldered and threaded like bolt 118 in Fig. 8, and care being taken to form the thread in proper direction for automatic self-tightening when shaft 222 is driven.

As so far described the fin displacing operation is used in conjunction with and immediately following the main rolling operation. This is desirable because it avoids the need for extra reeling and unreeling of the wire. However, it is possible to displace the fins in power-driven rolls, thus using two completely separate operations. For example, the wire may be coined in a rolling mill and reeled, and the wire may afterwards be fed from that reel into a separate rolling mill provided with fin displacing rolls. Such an arrangement is illustrated in Fig. 17, which shows a rolling mill head similar to that used for the main rolling operation in the previous description. Of course, this mill is designed for heavier duty than the fin displacing operation, and a special mill of lighter construction may be employed for the present purpose, but the present mill has the convenience of being available for either operation, it being necessary only to change the nature of the rolls used in the machine.

Referring to Fig. 17, the upper and lower fin displacing rolls are indicated at 240 and 242. These rolls have tapered shanks and are drawn into the main shafts by means of draw bolts 244 and 246. The countershaft and gearing are arranged as previously described. Axial adjustment for proper alignment of the rolls is obtained by means of micrometer adjusting screw 248. Radial adjustment for changing the center to center spacing of the rolls is obtained by means of adjusting screw 250, this functioning to slightly tilt the main bearing housing 54 about the trunnions 252, under control of a handle like that shown at 106 in Fig. 6. Because the rolls are both driven rolls, a rotative adjustment is also provided, this being obtained at the screws 254 which operate through slots in a flange 256, like those shown at 112 in Fig. 6.

It will be understood that the wire in passing through this machine runs edgewise, that is, with its width disposed vertically, instead of being disposed horizontally as in the case of the apparatus previously described.

The roll used in the machine of Fig. 17 may be an assembled roll. Thus referring to Figs. 19 and 20 the roll comprises a tapered shank 260, a toothed or serrated disc 262, and a collar or nut 264. The part 264 is threaded to receive the end of the drawbolt (244 in Fig. 17), so that the drawbolt holds the parts in assembled relation. The diameter of disc 262 is preferably made somewhat smaller than that of the adjacent parts, and these are preferably beveled at 266 and 268. In this way the assembled roll has a groove best shown in Fig. 20, into which groove the wire is readily guided. In order to strengthen the disc 262, and in order to insure concentricity, it may be thickened and stepped as indicated at 270 (Fig. 19), this step being received in a mating recess 272. An advantage of the assembled roll is that only the disc need be changed when the teeth are worn.

In the roll of Figs. 19 and 20, the teeth or serrations are most readily formed by cutting or milling, and therefore may be straight in an axial direction. However, teeth for the present purpose are preferably curved to insure a desired convex edge for the wire. It is convenient to curve the teeth if they are formed in a solid roll, such as is shown in Fig. 8 of the drawings. The configuration of the teeth may be approximately as shown in Fig. 18, which is a section taken axially of the roll. The curvature indicated at 274 at the base of the teeth functions to compress the displaced fin hard against the edges of the wire, and to insure a final convex or rounded condition, as is shown at 276 in Fig. 4. Even with the assembled roll of Fig. 19, the teeth may be curved, by appropriately working on the disc 262 when forming the teeth. We recommend the use of curved teeth, as it is important to avoid any possibility of the displaced fin metal being separated or spaced from the side edge of the wire, with consequent roughness.

It is believed that the fin displacing method of the present invention, as well as the construction and operation of machinery for practicing the same, will be apparent from the foregoing detailed description thereof. It will also be apparent that while we have described our invention in several preferred forms, many changes and modifications may be made in the structures disclosed without departing from the spirit of the invention, as sought to be defined in the following claims.

We claim:

1. Apparatus for finishing a strip of embryo fastener elements, said strip having serrated edges conforming to the ends of spread jaws of said embryo elements and having a series of thin triangular fins occupying the notches of the serrated edges, said apparatus comprising a spaced pair of fin displacing rolls, each having a serrated peripheral surface formed negatively to the serrated edges, bearings for rotatably mounting said rolls in position to engage opposite edges of said strip, said rolls being mounted to allow the strip and rolls to self-adjust to each other, and means to cause the strip to move through the space between the rolls.

2. Apparatus for finishing a strip of embryo fastener elements, said strip having serrated edges conforming to the ends of spread jaws of said embryo elements and having a series of thin triangular fins occupying the notches of the serrated edges, said apparatus comprising a spaced pair of fin displacing rolls, each having a serrated peripheral surface formed negatively to the serrated edges, bearings for rotatably mounting said rolls in position to engage opposite edges of said strip, means to allow the strip and rolls to self-adjust to each other, and means to cause the strip to move through the space between the rolls.

3. Apparatus for finishing a strip of embryo fastener elements, said strip having serrated edges conforming to the ends of spread jaws of said embryo elements and having a series of thin triangular fins occupying the notches of the serrated edges, said apparatus comprising a spaced pair of fin displacing rolls, each having a serrated peripheral surface formed negatively to the serrated edges, bearings for freely rotatably mounting said rolls in position to engage opposite edges of said strip, said rolls being adapted to turn idly in said bearings in order to automatically self-adjust them to the serrations in the strip, and means to cause the strip to move through the space between the rolls.

4. Apparatus for manufacturing a strip of embryo fastener elements, each of said elements comprising spaced jaws and a head with interlockable means, said strip having serrated edges conforming to the ends of said spread jaws, said apparatus comprising a rolling mill having a pair of small diameter coining rolls so mounted and driven as to be capable of pressing and thereby deforming a uniform wire into a nearly completed strip in a single passage through said rolls, said strip being completed except for a series of thin small triangular fins in the notches of the serrated edges, means to drive said coining rolls in synchronism, and a pair of fin displacing rolls disposed behind said coining rolls on axes perpendicular to the axes of the coining rolls, said fin displacing rolls each having a serrated peripheral surface formed negatively to the serrated edges, bearings for rotatably mounting said rolls in position to engage opposite edges of said strip, said rolls being mounted to allow the strip and rolls to self-adjust to each other, and power driven wind-up means for winding up the finished wire received from the aforesaid coining and fin-displacing rolls.

5. Apparatus for manufacturing a strip of embryo fastener elements, each of said elements comprising spread jaws and a head with interlockable means, said strip having serrated edges conforming to the ends of said spread jaws, said apparatus comprising a rolling mill having a pair of small diameter coining rolls so mounted and driven as to be capable of pressing and thereby deforming a uniform wire into a nearly completed strip in a single passage through said rolls, said strip being completed except for a series of thin small triangular fins in the notches of the serrated edges, means to drive said coining rolls in synchronism, means for relatively adjusting said coining rolls radially, axially and rotatively, and a pair of fin displacing rolls disposed behind said coining rolls on axes perpendicular to the axes of the coining rolls, said fin displacing rolls each having a serrated peripheral surface formed negatively to the serrated edges, bearings for rotatably mounting said rolls in position to engage opposite edges of said strip, said rolls being mounted to allow the strip and rolls to self-adjust to each other, means for relatively adjusting the center to center spacing of the rolls, means for relatively adjusting the rolls axially, and power driven wind-up means for winding up the finished strip received from the aforesaid coining and fin displacing rolls.

6. Apparatus for manufacturing a strip of embryo fastener elements, each of said elements comprising spread jaws and a head with interlockable means, said strip having serrated edges conforming to the ends of said spread jaws, said apparatus comprising a rolling mill having a pair of small diameter coining rolls so mounted and driven as to be capable of pressing and thereby deforming a uniform wire into a nearly completed strip in a single passage through said rolls, said strip being completed except for a series of thin small triangular fins in the notches of the serrated edges, means to drive said coining rolls in synchronism, and a pair of fin displacing rolls disposed behind said coining rolls on axes perpendicular to the axes of the coining rolls, said fin displacing rolls each having a serrated peripheral surface formed negatively to the serrated edges, bearings for freely rotatably mounting said rolls in position to engage opposite edges of said strip, said rolls being adapted to turn idly in said bearings in order to automatically self-adjust them to the serrations in the strip formed by the main coining rolls, and power driven wind-up means for winding up the finished strip received from the aforesaid coining and fin displacing rolls.

7. Apparatus for manufacturing a strip of embryo fastener elements, each of said elements comprising spread jaws and a head with interlockable means, said strip having serrated edges conforming to the ends of said spread jaws, said apparatus comprising a rolling mill having a pair of small diameter coining rolls so mounted and driven as to be capable of pressing and thereby deforming a uniform wire into a nearly completed strip in a single passage through said rolls, said strip being completed except for a series of thin small triangular fins in the notches of the serrated edges, means to drive said coining rolls in synchronism, means for relatively adjusting said coining rolls radially, axially and rotatively, and a pair of fin displacing rolls disposed behind said coining rolls on axes perpendicular to the axes of the coining rolls, said fin displacing rolls each having a serrated peripheral surface formed negatively to the serrated edges, bearings for freely rotatably mounting said rolls in position to engage opposite edges of said strip, said rolls being adapted to turn idly in said bearings in order to automatically self-adjust them to the serrations in the strip formed by the main coining rolls, means for relatively adjusting the center to center spacing of the rolls, means for relatively adjusting the center to center spacing of the rolls, means for relatively adjusting the rolls axially, and power driven wind-up means for winding up the finished strip received from the aforesaid coining and fin displacing rolls.

8. Apparatus for manufacturing a strip of embryo fastener elements, each of said elements comprising spread jaws and a head with interlockable means, said strip having serrated edges conforming to the ends of said spread jaws, said apparatus comprising a main rolling mill having a pair of small diameter coining rolls so mounted and driven as to be capable of pressing and thereby deforming a uniform wire into a nearly completed strip in a single passage through said rolls, said strip being completed except for a series of thin small triangular fins in the notches of the serrated edges, means to drive said coining rolls in synchronism, and a pair of fin displacing rolls disposed behind said coining rolls on axes perpendicular to the axes of the coining rolls, said fin displacing rolls each having a serrated peripheral surface formed negatively to the serrated edges, bearings for rotatably mounting said rolls in position to engage opposite edges of said strip, and wind-up means for winding up the finished wire received from the aforesaid coining and fin displacing rolls, a driving shaft for one of the fin displacing rolls, and belt and pulley or other friction drive means between the main rolling mill and said shaft in order to drive the fin displacing roll, the ratio of said friction drive means being such as to attempt to drive the fin displacing roll somewhat faster than synchronism with the main coining rolls.

9. Apparatus for manufacturing a strip of embryo fastener elements, each of said elements comprising spread jaws and a head with interlockable means, said strip having serrated edges conforming to the ends of said spread jaws, said apparatus comprising a main rolling mill having a pair of small diameter coining rolls so mounted and driven as to be capable of pressing and thereby deforming a uniform wire into a nearly completed strip in a single passage through said rolls, said strip being completed except for a series of thin small triangular fins in the notches of the serrated edges, means to drive said coining rolls in synchronism, means for relatively adjusting said coining rolls radially, axially and rotatively, and a pair of fin displacing rolls disposed behind said coining rolls on axes perpendicular to the axes of the coining rolls, said fin displacing rolls each having a serrated peripheral surface formed negatively to the serrated edges, bearings for rotatably mounting said rolls in position to engage opposite edges of said strip, means for relatively adjusting the center to center spacing of the rolls, means for relatively adjusting the rolls axially, and wind-up means for winding up the finished wire received from the aforesaid coining and fin displacing rolls, a driving shaft for one of the fin displacing rolls, and belt and pulley or other friction drive means between the main rolling mill and said shaft in order to drive the fin displacing roll, the ratio of said friction drive means being such as to attempt to drive the fin displacing roll somewhat faster than synchronism with the main coining rolls.

10. Apparatus for finishing a strip of embryo fastener elements, said strip having serrated edges conforming to the ends of spread jaws of said embryo elements and having a series of thin triangular fins occupying the notches of the serrated edges, said apparatus comprising a spaced single pair of fin displacing rolls, each having a serrated peripheral surface formed negatively to the serrated edges, bearings for rotatably mounting said rolls in position to engage opposite edges of said strip, and power-driven means for driving said rolls synchronously in opposite directions.

11. Apparatus for finishing a strip of embryo fastener elements, said strip having serrated edges conforming to the ends of spread jaws of said embryo elements and having a series of thin triangular fins occupying the notches of the serrated edges, said apparatus comprising a spaced single pair of fin displacing rolls, each having a serrated peripheral surface formed negatively to the serrated edges, bearings for rotatably mounting said rolls in position to engage opposite edges of said strip, means affording rotative adjustment of one roll relative to the other, and power-driven means for driving said rolls synchronously in opposite directions.

12. Apparatus for finishing a strip of embryo fastener elements, said strip having serrated edges conforming to the ends of spread jaws of said embryo elements and having a series of thin triangular fins occupying the notches of the serrated edges, said apparatus comprising a spaced single pair of fin displacing rolls, each having a serrated peripheral surface formed negatively to the serrated edges, bearings for rotatably mounting said rolls in position to engage opposite edges of said strip, means for relatively adjusting the center to center spacing of the rolls, means for relatively adjusting the rolls axially, means affording rotative adjustment of one roll relative to the other, and power-driven means for driving said rolls synchronously in opposite directions.

13. In the manufacture of a strip of embryo fastener elements, each having a head and spread jaws, said head being nested within and filling the space between the jaws of the next element, the side edges of the strip having serrated edges conforming to the ends of the spread jaws, the method which includes running a piece of uniform wire between a single pair of small diameter coining rolls shaped negatively to the desired strip while driving said rolls under high pressure and torque adequate to deform the wire in a single passage into a nearly finished strip exactly like the desired strip except for a series of thin triangular fins in the notches of the serrated edges, immediately thereafter passing said strip between a spaced pair of fin displacing rolls having serrated peripheries shaped negatively to the desired serrated edges, permitting the fin displacing rolls and strip to self-adjust to each other, and winding up the finished wire on a reel under power.

14. In the manufacture of a strip of embryo fastener elements, each having a head and spread jaws, said head being nested within and filling the space between the jaws of the next element, the side edges of the strip having serrated edges conforming to the ends of the spread jaws, the method which includes running a piece of uniform wire between small diameter coining rolls shaped negatively to the desired strip while driving said rolls under high pressure and torque adequate to deform the wire in a single passage into a nearly finished strip exactly like the desired strip except for a series of thin triangular fins in the notches of the serrated edges, immediately thereafter passing said wire between a spaced pair of fin displacing rolls having serrated peripheries shaped negatively to the desired serrated edges, permitting said fin displacing rolls to turn idly in order to automatically self-adjust themselves to the serrations in the strip formed by the main coining rolls, and winding up the finished wire on a reel under power.

15. In the manufacture of a strip of embryo fastener elements, each having a head and spread jaws, said head being nested within and filling the space between the jaws of the next element, the side edges of the strip having serrated edges conforming to the ends of the spread jaws, the method which includes running a piece of uniform wire between small diameter coining rolls shaped negatively to the desired strip while driving said rolls under high pressure and torque adequate to deform the wire in a single passage into a nearly finished strip exactly like the desired strip except for a series of thin triangular fins in the notches of the serrated edges, immediately thereafter passing said wire between a spaced pair of fin displacing rolls having serrated peripheries shaped negatively to the desired serrated edges, and frictionally driving one of said fin displacing rolls at an attempted speed greater than synchronism relative to the speed of the main coining rolls.

GEORGE WINTRISS.
DAVID RABINOW.